INFERENCE UNIT

Filed Dec. 20, 1961

2 Sheets-Sheet 1

INVENTORS
RICHARD M. ARMSTRONG
ROBERT M. MEADE
BY *Carl C. Kling*
ATTORNEY

Feb. 8, 1966 R. M. ARMSTRONG ETAL 3,234,522

INFERENCE UNIT

Filed Dec. 20, 1961

2 Sheets-Sheet 2

3,234,522
INFERENCE UNIT

Richard M. Armstrong, Poughkeepsie, and Robert M. Meade, Wassaic, N.Y., assignors to International Business Machines Corporation, New York, N.Y., a corporation of New York Filed Dec. 20, 1961, Ser. No. 160,805
4 Claims. (Cl. 340—172.5)

This invention relates to digital computers and more particularly to a statistical inference unit which can develop sequential inferences from a sequence of related inputs and provide statistical analyses of the inferences.

The function of the inference unit (F unit) is to determine significant relationships between two successive pairs of operands, to develop and store status signals according to such determined relationships, to count the status signals and to emit supplemental control signals as a result of a comparison between the accumulated count and a limit established by the programer.

The inputs to the inference unit may have significance assigned by the programer. Three prime inputs, i.e., inputs received from an external source, designated KB, LB and MB can specify, for example, a relationship between operands P and Q supplied to the external source, the relationship being either KB ($P>Q$), LB ($P=Q$) or MB ($P<Q$). The three prime inputs can also indicate the result of combining the external operands P and Q through a logical operation. The relationship is that signal LB indicates that the result is all zeros, KB indicates odd parity and MB indicates even parity of the result, LB all zeros and MB even parity, parity being the sum (modulo 2) of the 1 bits.

The function of the inference unit is to determine if a desired relationship exists between operands supplied to the external source. It does this by comparing the prime inputs according to preset program information to provide implication signals, combining succeeding prime inputs and the implication signals to generate inference signals, and counting inference signals. Comparing this count of inference signals with a preset limit permits inferences with respect to a program-known sequence. The actual operands which serve as input defining factors may be processed by mechanism outside the scope of this patent application according to control signals developed from the inference signals.

*Prior knowledge*

Digital computers generally operate on data coded in binary fashion. The smallest item of information is a bit. Each bit can be either electrically present or absent, or in the usual parlance, 1-value or 0-value. A term which is becoming common for a binary capability, or bit position, is "binit," which can be either a 0 or a 1. A small number of binits which are generally handled together are termed a "byte." A byte in the preferred embodiment includes eight binits of data and a parity binit. The function of the bit in the parity binit is to augment the number of one bits in the byte by its own value 1 or 0 so that the total number of bits is odd. One or more bytes can be combined together to form a field, which is the basic information grouping for most communication situations within the computer. Another arrangement of bytes is the "word" which generally is a fixed number of bytes often chosen as the basic approach to memory; i.e., any reference to a memory address reads out or stores a word. Another information grouping is the "record" which is an indeterminate number of bytes, fields, or words having a contextual relationship but which is generally not treated by the computer as an entity. This invention operates on another information grouping, which will be referred to herein as the "group." The group may be thought of as a word, field record, or other assemblage of bytes as the application demands, and its characteristic is specified by the programer.

Data processing machines in prior art have generally been made to be as accurate and as unswerving in their attention to detail as possible. Extensive checking mechanisms have been developed to insure that absolute accuracy is incorporated in each machine. There are, however, situations where the programer is interested in maintaining maximum processing efficiency by accepting statistical probabilities of correctness. For example, an instruction in a program being compiled may be written STONE when the computer does not include any such capability. STONE, however, is almost equal to STORE which is included in the program capability. There is a need in these situations for the computer to recognize the "almost equal" situation. Other situations may involve statistical processing in which the end result is not desired in accurate digital form but merely in statistical probabilities.

It is accepted that human reasoning functions in a mode of operation involving complex inferences. For example, a postman does a statistical determination many times each day on misspelled names. He looks at the entire address, which may be Smiths Institute; Washington 5, D.G. He immediately ignores the punctuation. There is no Smiths Institute but the similarity to Smithsonian Institution is close to 80%. The proper zone presents no problem since people often leave that out. Since there is no State D.G., the postman mentally converts to D.C. and delivers the letter. The postman does this complex reasoning without really thinking about its complexity. He recognizes that there are certain inadequacies in the address. He makes a determination (guess) as to where these inadequacies lie, by comparing the inadequate address with the closest known adequate address. Subconsciously, he counts or in some other manner correlates the number of matches between the inadequate address and the closest known adequate address—where the number of matches is too small he assigns the letter to a dead letter file.

A record card sorter in the prior art, IBM Type 9310 Card Scanner, operates by comparing specific fields of a punched record card with specific fields of a master record card to determine the number of fields of the record card which match the associated fields of the master card. See U.S. Patent 2,969,876, January 31, 1961, Luhn, Information Searching Device, assignee IBM, for details. The destination of the card is controlled according to the number of matches. For example, if four of the six fields of the record card match the associated fields of the master card, the card is sent to pocket 4. The operator, from a quick scan, notes the highest number pocket containing a card. He can determine whether there are any record cards which are full duplicates of the master card (cards in pocket 6 if there are six fields), he can pull from the next highest pocket containing cards those cards which are almost equal (5-out-of-6, 4-out-of-6, etc.)

A certain amount of inferential processing is incorporated in modern character recognition schemes, but this inferential processing is most often done on an analog or quasi-analog basis. Each character is considered as a finite number of bits, and the number and placement of bits representing blackness of the character are compared in some way with a standard bit pattern representing the known acceptable values for the character. Character recognition logic generally is special purpose logic not particularly useful in other applications.

A fairly complex statistical analyzing system is described in U.S. Patent Number 3,021,069, issued February 13, 1962, Statistical Analyzing System, Rowley et al., assignee IBM. A group of statistical counts are developed. Each count is recorded to provide a weighted count. The weighted counts are added in an adder to an initial amount previously set into the adder. When the total of initial amount and all weighted counts surpasses the capacity of the adder, a "hit trigger" is set. The hit trigger output "hit signal" indicates statistical significance greater than the present threshold. The basic approach of the statistical analyzing system is to correlate inputs by providing a scale through weights and thresholds. Thus information of different types can be examined together for special relationships. These relationships are developed for a number of events which occur in a sequence, but the significance of the events is the number of event occurrences, not the sequence in which the events occur.

Inferences from sequences of events can be developed by programing of existing computers, but not in a particularly straightforward and economical manner. Such steps as compare, count, compare count with a norm, reset count and others are necessary to develop inferences from the sequence in which events occur. The number of loops and decisions is substantial.

Objects of the invention are:

(1) To determine significant relationships between pairs of operands by examination of input defining factors related to such pairs, to develop and store status signals according to such relationships and to emit control signals accordingly.

(2) To count status signals developed according to significant relationships between successive operand pairs, to compare the count with a preset limit, and to emit control signals as the count reaches the limit.

*Summary*

The inference unit (F unit) responds to comparison inputs from an adder such as that disclosed in U.S. Patent No. 3,222,506, issued December 7, 1965 (application serial number 152,831, filed November 16, 1961), Robert M. Meade, Logic Unit, assignee IBM, and to control inputs from a program unit (not specifically disclosed) to provide the selected one of several functions. These functions are essentially signals that the input defining factors bear the selected relationship with one another or that they do not bear such relationship, as determined by a count of those bytes which do not bear the selected relationship.

The invention accepts prime inputs LB, KB, MB, which respectively either specify $A=B$, $A>B$, $A=B$, $A<B$ or that the result has all zeros or that its parity is odd or even. A control input for the inference unit specifies one out of the possible connectives of the prime inputs into the unit and the stored signals indicating the status of the previous prime inputs to the inference unit. These connectives specify desired comparisons between the successive byte pairs in the logic unit which generate the prime inputs KB, LB, and MB. A count of the successful comparison results is developed and continuously compared with a preset maximum count. When the count of comparisons reaches the present maximum count, an $F=$limit signal is developed, which indicates that the inputs to the logic unit bear the selected relationship. When comparison is completed without the $F=$limit signal being developed, the inference is that the inputs do not bear the selected relationship.

Features of the invention are:

(1) Microprograming techniques are used throughout the F unit. A control byte from storage sets a group of triggers to selected values. The outputs of these triggers directly control gating logic so that the inferences can be produced most advantageously.

(2) Dynamic outputs, i.e., outputs from a unit such as an AND or an OR which are due to the presence of the inputs to the unit and exist only so long as the required inputs are present, develop as soon as prime inputs are available, without a wait for the next clocking interval. Certain inference signal generators, such as that for $F=$limit, are present as gates primed by a signal from the implication box, e.g., ($F=>$limit) so that upon conditioning by the prime input the gate signal ($F=$limit) is immediate. The actual registration of the $F=$limit status in triggers may occur later, but meanwhile the dynamic output has been available for use.

Advantages of the invention are:

(1) It can be used to make otherwise unacceptable data or instruction words acceptable in those situations where digital accuracy is not required, thus allowing the computer to proceed without human assistance.

(2) Microprograming techniques allow the bit structure of the control word to operate gates within the unit directly.

(3) High speed logic and dynamic signal techniques allow very fast operation. The dynamic signal indicating that the count F equals the preset limit 4, for example, develops during the fourth cycle even though the actual count of $F=4$ is not registered until the start of the next cycle.

The foregoing and other objects, features and advantages of the invention will be apparent from the following more particular description of a preferred embodiment, as illustrated in the accompanying drawings.

*Figures*

Figure 1:
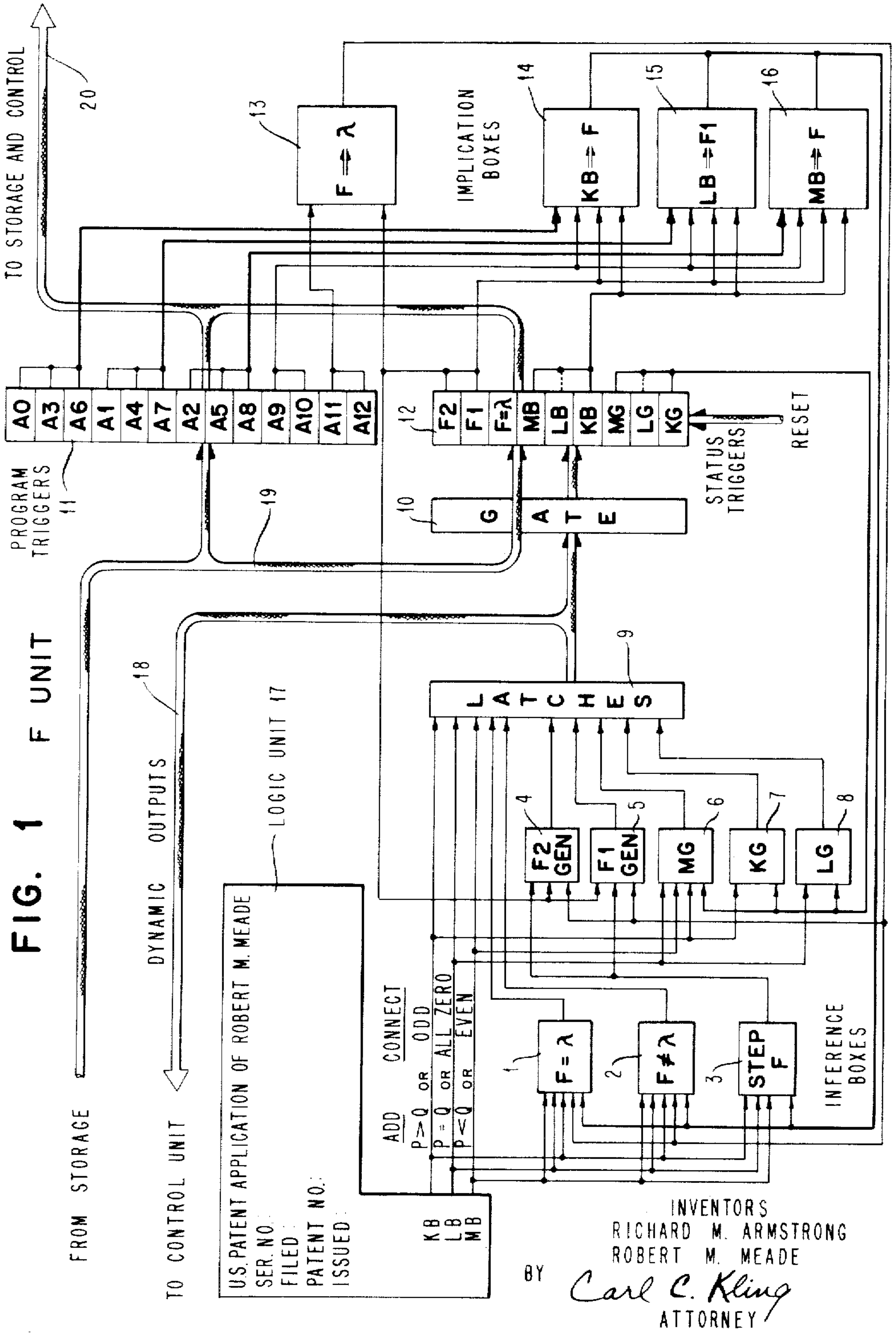
FIGURE 1 is a block diagram of the invention.

*F unit general functions—FIGURE 1*

The inference unit (F unit) receives prime inputs from a logic unit such as that disclosed in the aforesaid LOGIC UNIT disclosure. The logic unit receives input data bytes and modulus data and combines them to provide a combinatorial output; it simultaneously provides the F unit with prime inputs indicating the relationship between the bytes currently being combined in the logic unit. The logic unit operates in two modes. In add mode it combines two input bytes P and Q algebraically and compares the magnitudes of inputs P and Q; in logical connect mode it combines the two input bytes P and Q on a bit-by-bit basis and generates parity on the result or indicates that the result is all zeros. The prime inputs are generally:

| Prime Input | Add Mode | Logical Connect Mode |
|---|---|---|
| KB | $P>Q$ | Odd Parity. |
| LB | $P=Q$ | All Zeros. |
| MB | $P<Q$ | Even Parity. |

So far as the F unit itself is concerned, the significance of the prime inputs is immaterial. It deals with the prime inputs and their sequence according to a format controlled by a program.

During logical connective operations of the logic unit, bytes P and Q are combined on a bit-for-bit basis and the prime inputs KB, LB, MB to the F unit indicate the parity of the result, whether odd, or even or if it is all zeros.

During add-type operations, data bytes P and Q are combined in the logic unit on a carry-producing basis or according to some special directions and the prime inputs KB, LB, MB from the logic unit to the F unit indicate the size relationship between the two byte inputs to the logic unit, i.e., whether $P>Q$, $P=Q$ or $P<Q$.

The F unit generates and counts occurrences of a specified two factor sequence of the input defining factors KB, LB, MB. Its basic use is to make tests on the relationship between successive pairs of input operands to the logic unit by examination of the input defining factors KB, LB, MB. Its operation is specified by program triggers that establish the function to be counted, the limit of the count and certain special controls. The value of F is established in a two-binit binary counter in the preferred emmodiment; it is compared to a preset limit to generate the signal $F$=LIMIT when appropriate.

The F unit thus includes an F counter, a limit defining mechanism, comparison means to determine when the F count is reaching the limit and program control to determine the parameters which are counted by the F unit. Because speed is a factor, anticipation circuits are incorporated so that the $F$=LIMIT control signal and other appropriate output signals can be developed promptly upon application of the proper prime input rather than upon setting of a static control signal developer such as a trigger.

*F unit functional details—FIGURE 1*

Prime inputs KB, LB, MB from the logic unit connect directly to $F$=LIMIT box 1, $F\neq$LIMIT box 2 and STEP F box 3, connect through these boxes 1, 2, and 3 to function generators 4–8 and connect directly to latches 9 together with the outputs of the function generators. Boxes 1–8 can be termed "inferences boxes."

$F$=LIMIT box 1 provides a dynamic output immediately upon receipt of the prime input which is to make F equal the limit, even though the actual counting of F occurs at the end of the cycle (on the leading edge of the next cycle).

$F\neq$LIMIT box 2 similarly provides an output immediately upon receipt of prime inputs which are not to make F equal to the limit, even though the actual counting occurs at the end of the cycle.

STEP F box 3 recodes the prime inputs into the proper form to step the F count selectively according to the type of prime input and program information which is fed to STEP F box 3 from other elements via feedback paths.

Group inference boxes 4–8 respond to output patterns of Step F, Box 3, prime inputs KB, LB and MB from logic unit 17 and status signals fed back from status triggers 12.

F2 GEN Box 4 and F1 GEN Box 5 jointly provide the new F count. This F count normally steps one upon each output of Step F Box 3; when $F$=limit they are set to 00.

Group inference boxes MG, KG, LG 6, 7, 8 summarize the relative magnitudes (or the parities) over a collection of bytes which is the to-date history of the group.

Latches 9 maintain the applied signals steady during the time that they must be examined by receiving circuits, which may be control circuits of the basic computer or may be downstream circuits within the F unit. Dynamic outputs are available from the latches on bus 18. Gate 10 controls passage of signals from latch 9 to the downstream circuits of the F unit.

*Program and status triggers*

Thirteen program triggers A0 to A12 (reference character 11) receive information from storage via bus 19 and retain it for use by the implication boxes of the F unit. Microprograming techniques are used; i.e., program triggers 11 directly and in minor combinations control logical circuits throughout the F unit. They also provide information to storage and control areas of the computer via bus 20.

Gate 10 passes information from latches 9 to status triggers 12 which thus are set to reflect the condition of the inference boxes of the F unit at the end of the previous cycle. Status triggers 12 feed implication boxes 13–16 which decode the information applied to them to determine whether the implications associated with boxes 13–16 exist.

Status triggers 12 are as follows:

(1) F2 ---- High order bit of the F counter.
(2) F1 ---- Low order bit of the F counter.
(3) F=λ --- F equals the limit.
(4) MB --- Prime input was MB.
(*) (LB --- Prime input was LB)* inferred from $\overline{M}\cdot\overline{K}$.
(5) KB ---- Prime input was KB.
(6) MG --- Group $P<Q$.
(*) (LG --- Group to date $P=Q$).
(7) KG ---- Group $P>Q$.

*Inference boxes*

F ALMOST EQUAL LIMIT ($F=>\lambda$) box 13 provides its functional output continuously after the F count has reached one increment short of the limit. This functional output is fed back to boxes 1–3 to help prepare them for correct inferential outputs. One more F count after $F=>\lambda$ generates its output will cause F to equal the limit.

KB implies F box 14 ($KB=>F$) responds to program triggers 11 and status triggers 12 to recognize the situations in which occurrence of KB as the next prime input is to be counted as an F stimulus.

For example, if numbers greater than a norm 5 are the F stimuli, and if the limit is 3, $F=>\lambda$ box 13 emits a continuous output after the F count has reached 2, to indicate that the count of F differs from the limit by a single counting unit. A P-number series may be 678427916. The norm Q is 5. The limit is 3.

| | | | | | | | | | |
|---|---|---|---|---|---|---|---|---|---|
| P number series | 6 | 3 | 8 | 4 | 2 | 7 | 9 | 1 | 6 |
| Q number | 5 | 5 | 5 | 5 | 5 | 5 | 5 | 5 | 5 |
| KB(P>Q)=>F | F | – | F | – | – | F | | | |
| F counter 00 | 01 | 01 | 10 | 10 | 10 | 11 | | | |
| F=> limit | – | – | X | X | X | | | | |
| F=limit | – | – | – | – | – | X | | | |

LB implies F box 15 ($LB=>F$) responds to program triggers 11 and status triggers 12 to recognize the situations in which occurrence of LB as the next prime input is to be counted as an F stimulus.

MB implies F box 16 ($MB=>F$) responds to program triggers 11 and status triggers 12 to recognize the situations in which occurrence of MB as the next prime input is to be counted as an F stimulus.

Implication boxes 13–16 feed back their output signals to inference boxes 1–8 and latches 9.

Because status triggers 12 merely reflect the dynamic output signals developed immediately upon receipt of the prime input and prior to setting the status triggers, they are designated with the term of the dynamic output which sets them. The status trigger output signals, however, include the letter "O" (old) as part of their designation. The output of status trigger MB thus is OMB.

*Trigger assignments*

Program triggers 11 control stepping of the F counter by combinations of selected prime inputs coincident with selected status signals as follows:

*Step F*

A0 ---------- OKB·KB
A1 ---------- OKB·LB
A2 ---------- OKB·MB
A3 ---------- OLB·KB
A4 ---------- OLB·LB
A5 ---------- OLB·MB
A6 ---------- OMB·KB
A7 ---------- OMB·LB
A8 ---------- OMB·MB

Program triggers A9 and A10 have special definitions according to their composite values as follows:

| A9 | A10 | Result |
|---|---|---|
| 0 | 0 | No modification. |
| 1 | 0 | Invert previous value of F1 for each stepping pulse; this increases the F counting scale to 2. |
| 0 | 1 | Issue F=limit signal on first stepping pulse and leave F on; thus F=limit comes on and stays on. |

Program triggers A11 and A12 set the limit of F as

| A11 | A12 | Result |
|---|---|---|
| 0 | 0 | F limit is 4. |
| 0 | 1 | F limit is 1. |
| 1 | 0 | F limit is 2. |
| 1 | 1 | F limit is 3. |

Status triggers F2 and F1, together with associated circuits, form the F counter. F2 is the high order bit; F1 is the low order bit.

| F2 | F1 | F Count |
|---|---|---|
| 0 | 0 | 0 |
| 0 | 1 | 1 |
| 1 | 0 | 2 |
| 1 | 1 | 3 |
| 0 | 0 | [1] 4 |

[1] 0 for next count.

The F counter is reset to 00 upon reaching the limit; it is also reset by an end of group (EOG) signal from the control unit or by a *reset* whether it has reached the limit or not. The reset of the F unit is accomplished by one of four ways:

(1) By reaching limit.
(2) Power on reset.
(3) End of group.
(4) A reset F adjustment.

The first reset condition is accomplished by permitting the step function to reset the F counter whenever that step would cause the F counter to equal the limit. The three remaining resets are all controlled directly by the program unit. All of the preceding conditions cause a reset F trigger to be turned on. It takes at least one cycle without data movement to successfully reset the F triggers. For the two cases (power on and EOG) there is no data movement. For the adjustment reset, an adjustment delay trigger is used to provide the necessary one-cycle delay.

LOGIC UNIT OPERATIONS

A preferred logic unit is disclosed in the above noted application for a logic unit. This logic unit receives streams of input bytes P and Q and provides outputs among which are the prime inputs KB, LB and HB to the F unit. The logic unit also provides combinations of its input bytes to other segments of the computer not tied closely to the F unit. It may provide the sum $P+Q=R$, for example, and at the same time provide the F unit with KB, signifying $P>Q$.

Input byte streams P and Q may be number series or other sequences. The logic unit has two basic modes of operation, logical connect and add. Logical connect is on a binit-by-binit basis; add can include comparisons and carries between binits and between bytes. Its operation repertoire includes Ops 0–15 for logical connective mode and Ops 16–30 for add mode. The logic unit also has a modular add operation, Op 31, which does not concern the F unit except for requiring suppression of prime inputs.

*KG, LG, and MG generation*

KG, LG, and MG are signals that originate in the F unit and reflect certain information about the group of data bytes being processed through the logic unit. Assume that A is the first byte of a group whose last byte is Z, and W, an arbitrary byte taken between these limits is the current byte being processed. The group signal will reflect information about all previously processed bytes A through V, inclusive. The KG, LG, and MG signals do not become true group signals until after the last byte (Z) has been processed, since they are at least theoretically changeable by the prime inputs developed for the last byte pair. The exact definition of the meaning of these signals is operation-dependent.

LOGICAL CONNECT MODE—LOGIC UNIT OPS 0–15

During logical connect mode operations bytes P and Q are combined in the logic unit on a binit-by-binit basis, without carries. For two binits, one from each byte there are sixteen possible bit-by-bit logical connectives, which can be numbered 0–15. These connectives, and the result of applying them to two examples $P=1111$ and $Q=0110$ (Result A) and to $P=0011$ and $Q=0101$ (Result B) are shown in the chart below:

| Connective | Op Code | Result A | Result B |
|---|---|---|---|
| All Zeros (don't care) | 0 | 0000 | 0000 |
| P.Q | 1 | 0110 | 0001 |
| $P.\bar{Q}$ | 2 | 1001 | 0010 |
| P (don't care Q) | 3 | 1111 | 0011 |
| $\bar{P}.Q$ | 4 | 0000 | 0100 |
| Q (don't care P) | 5 | 0110 | 0101 |
| P V Q (EXCLUSIVE OR) | 6 | 1001 | 0110 |
| PvQ | 7 | 1111 | 0111 |
| $\bar{P}.\bar{Q}$ | 8 | 0000 | 1000 |
| P=Q (identity) | 9 | 0110 | 1001 |
| $\bar{Q}$ (don't care P) | 10 | 1001 | 1010 |
| $Pv\bar{Q}$ | 11 | 1111 | 1011 |
| $\bar{P}$ (don't care Q) | 12 | 0000 | 1100 |
| $\bar{P}vQ$ | 13 | 0110 | 1101 |
| $\bar{P}v\bar{Q}$ | 14 | 1001 | 1110 |
| All Ones (don't care) | 15 | 1111 | 1111 |

ADD MODE—LOGIC UNIT OPS 16–30

| OP Code | Operation Performed | Validity |
|---|---|---|
| 16 | MAX (P, Q) | |
| 17 | MIN (P, Q) | |
| 24 | $(P \geq Q => P-Q)(P<Q=>0\text{'s})$ | |
| 25 | $(P \geq Q => P-Q)(P<Q=>\text{no byte})$ | No. |
| 26 | $(Q \geq P => Q-P)(Q<P=>0\text{'s})$ | |
| 27 | $(Q \geq P => Q-P)(Q<P=>\text{no byte})$ | No. |
| 28 | P−Q/MODULO M/ | |
| 29 | Q−P/MODULO M/ | |
| 30 | P+Q/BINARY/ | |
| 31 | P+Q/MODULO M/ | |
| 18 | $P=Q=>P)(P \neq Q=>0\text{'s})$ | |
| 19 | $(P=Q=>P)(P \neq Q=>\text{no byte})$ | No. |
| 20 | $(P \neq Q=P)(P=Q=>0\text{'s})$ | |
| 21 | $(P \neq Q=>P)(P=Q=>\text{no byte})$ | No. |
| 22 | $(P \neq Q=>Q)(P=Q=>0\text{'s})$ | |
| 23 | $(P \neq Q=>Q)(P=>\text{no byte})$ | No. |

*Operation summary—see FIGURE 1–F unit*

Logic unit 17 combines its input bytes P and Q according to an Op code. Op codes 0–15 specify logical connect mode operations; Op codes 16–31 specify add mode operations. The logic unit provides outputs KB, LB, MB which are prime inputs to the F unit, as follows:

| | Add | Connect |
|---|---|---|
| KB | P>Q | Odd parity. |
| LB | P=Q | All zeros. |
| MB | P<Q | Even parity. |

Prime inputs KB, LB, MB are applied directly to F limit boxes 1–2, Step F box 3, group signal boxes 6, 7, 8 and latches 9. Latches 9 are conventional units in which the output is normally the same as the input but having a control input for a timing signal which when energized will hold or latch the output against further change by the input signal. These latches 9 provide dynamic outputs on bus 18. Inference boxes 1–8 connect to the inputs of latches 9; inference boxes 1–8 function as dynamic output generation boxes since they are directly responsive to inputs. Before movement of the first prime input into the F unit, boxes 1, 3–8 have no input signals and are deconditioned. The first prime input (one only of KB, LB, MB) flows through latches 9 to set status triggers 12 and by feeding one of the boxes 14 to 16 causes conditioning of one or more boxes 1–8. Succeeding prime inputs similarly flow through latches 9 and one or more of the conditional boxes 1–8 to set respectively related status triggers 12.

The F Unit draws inferences from the *sequence* of prime inputs. Boxes 1–8 produce dynamic signals indicative of the sequential pattern; status triggers 12 store these pattern signals and feed them back via implication boxes 13–16 to inference boxes 1–8.

Program triggers 11 include triggers A0–A8 which are set to values dictated by the desired operation; they provide gatings necessary within the F unit to carry out the desired operation. Program triggers 11 also include triggers A11, A12 which are set to a count value which defines the limit of F. Status triggers 12 include triggers F1, F2 which cooperate with dynamic output generation boxes F2 GEN 4 and F1 GEN 5 to act as an F counter. When the F count becomes one increment less than the limit, $F=>\lambda$ box 13 is conditioned; its output feeds back to $F=\lambda$ box 1.

Program triggers 11 and status triggers 12 also control other implication boxes 14–16. Full flexibility provision allows each combination of one of (KB, LB, MB) following one of (KB, LB, MB) to imply a step of F. KB followed by MB, for example, can imply an F step; under different program trigger settings, MB followed by LB can imply F, etc.

Implication signals from implication boxes 14–16 feed back to inference boxes 1–8 so that the inferences can be derived directly as dynamic outputs within minimum logical delay. $MB=>F16$ output, for example, combines directly with prime input MB at Step F box 3 to provide dynamic output Step F. It also combines with $F=>\lambda$ and prime input MB at $F=\lambda$ box 1 to provide dynamic output $F=\lambda$.

Under control program triggers 11, the F unit thus responds to selected sequences of prime inputs to count occurrences of the sequences, and to the count itself by producing the signal $F=\lambda$ as the count is reaching the limit.

DETAILS—SEE FIGURES 2, 3, 4

Figures 2, 3, 4:
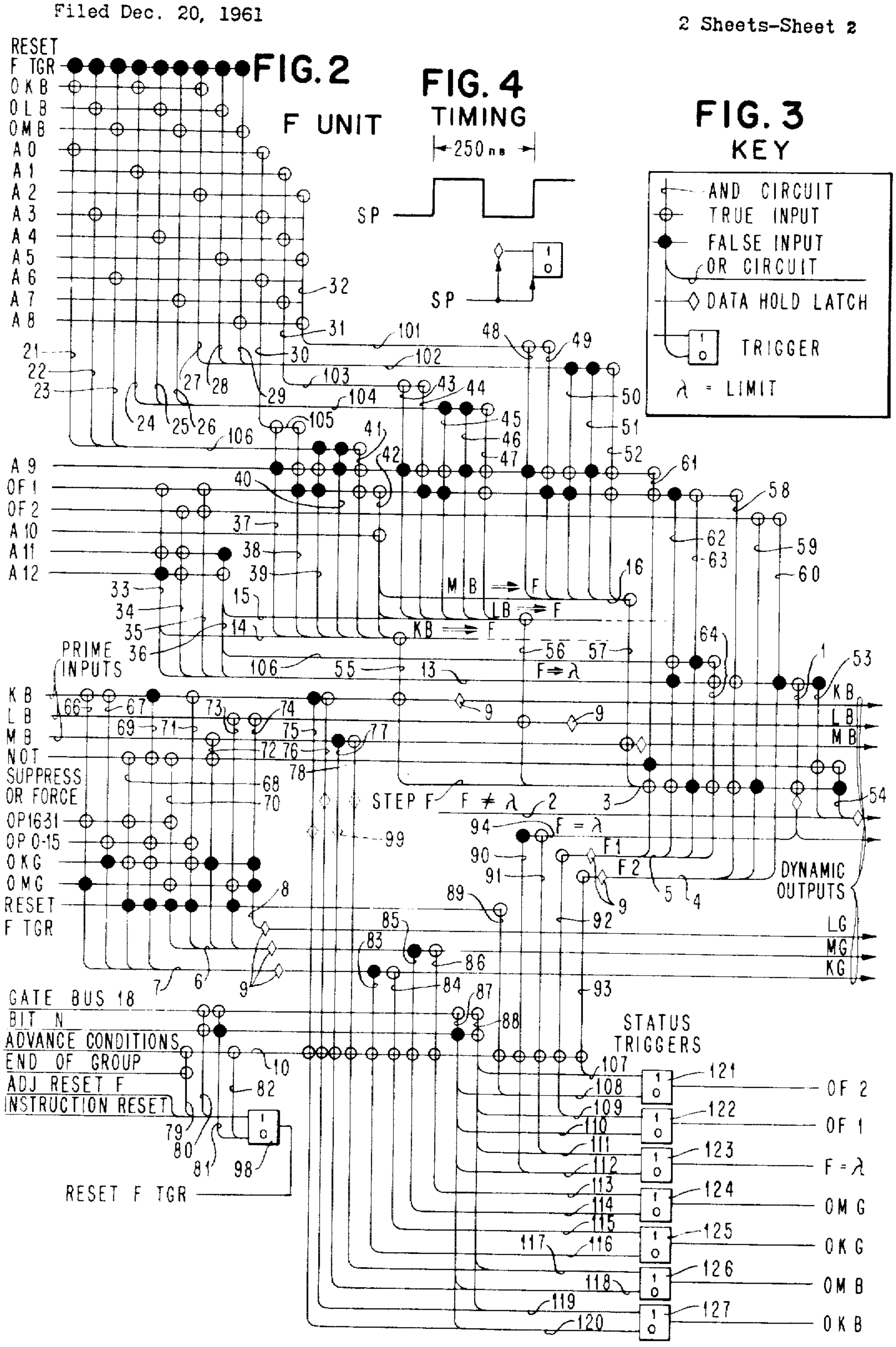
FIGURE 2 is a schematic diagram of the invention corresponding to the block diagram of FIGURE 1. Each item of FIGURE 1 is shown in detail in FIGURE 2; identical reference numerals are used.
FIGURE 3 is a key to the symbolism of FIGURE 2.
FIGURE 4 illustrates basic timing.

FIGURE 2 shows all features of FIGURE 1 in schematic logical diagram form. FIGURE 3 is a key to the diagram; FIGURE 4 shows basic timing.

*Key—FIGURE 3*

The key drawing shows the following definitions.

A vertical line indicates an AND circuit.

A horizontal line indicates a conductor.

An open circle around the intersection of a conductor (horizontal line) and an AND circuit (vertical line) indicates that the conductor is connected in true fashion as input to the AND circuit.

A blackened circle around the intersection of a conductor line with an AND circuit line indicates that the conductor is connected in false fashion (complement) to the AND circuit.

A line fillet from an AND line to a conductor line indicates an OR circuit; this OR circuit includes all fillet inputs to the output conductor line and may also be considered to include the conductor line. A reference character for the OR circuit normally is indexed to the conductor line.

Uncircled crossovers of an AND line and conductor line are not connected.

A diamond is a data hold latch.

A small rectangle with inscribed 1 and 0 is a trigger.

Throughout the figures, Greek letter λ (lambda) signifies "limit."

*Timing—FIGURE 4*

FIGURE 4 shows the relationship of latch and trigger with respect to timing samples pulses. The sample pulse may be thought of as a 250 nanosecond square wave.

High speed operation demands high quality circuits, which in the preferred embodiment are current mode transistor logic circuits. These logic circuits are cascaded in a fashion such that problem flow during each timing interval is from a given set of triggers to the downstream set of triggers next succeeding, via a small number of non-storage logic stages. To prevent problem ripple from occurring it is stipulated that there is to be no dynamic change of trigger settings during the sample pulse. Each trigger thus is static during the time that its output is to feed downstream logic.

The latch assures that the input of its trigger will be static during the sample pulse. Both latch and trigger receive the same sample pulse. This sample pulse prevents dynamic change in the latch and causes read into the trigger.

The latch thus acts as a data hold. During the non-sample interval it allows dynamic change; an upstream trigger which changes state can cause downstream changes within the limits of logic circuit speed. These dynamic changes usually flow to the next trigger downstream.

Upon occurrence of the next sample pulse, dynamic change in all latches is stopped. The data is frozen during the sample pulse by the data hold latch; this allows the trigger to be set during the sample interval to a value determined by a dependably frozen input from the data hold latch.

F UNIT—FIGURE 2 (SEE FIGURE 1)

*Program triggers*

Program triggers 11 of FIGURE 1 are omitted in FIGURE 2. Program trigger outputs are gated as inputs onto conductors labeled at left with the appropriate signal.

Signals NOT SUPPRESS OR FORCED, OP 16–31 OP 0–15, GATE PROGRAM BIT N, ADVANCE CONDITIONS, END OF GROUP, ADJ RESET F and INSTRUCTION RESET are available at left from a program unit not shown.

Signal RESET F TGR is produced by trigger 98 at lower left and made available both at upper and lower left of FIGURE 2.

The program gate signals are combined by AND circuits 21–32 which feed OR circuits 101–105. Charts of these program gate combining logic circuits and their inputs follow (reset inputs are not listed).

PROGRAM TRIGGERS

AND CHART

| Circuit Type | Reference Number | Inputs | Outputs |
|---|---|---|---|
| AND | 21 | OKB, A0 | OKB·A0. |
| AND | 22 | OLB, A3 | OLB·A3. |
| AND | 23 | OMB, A6 | OMB·A6. |
| AND | 24 | OKB, A1 | OKB·A1. |
| AND | 25 | OLB, A4 | OLB·A4. |
| AND | 26 | OMB, A7 | OMB·A7. |
| AND | 27 | OKB, A2 | OKB·A2. |
| AND | 28 | OLB, A5 | OLB·A5. |
| AND | 29 | OMB, A8 | OMB·A8. |
| AND | 30 | A0, A3, A6 | A0·A3·A6. |
| AND | 31 | A1, A4, A7 | A1·A4·A7. |
| AND | 32 | A2, A5, A8 | A2·A5·A8. |

OR CHART

| Circuit Type | Reference Number | Inputs | Outputs |
|---|---|---|---|
| OR | 101 | AND 32 | A2·A5·A8. |
| OR | 102 | ANDs 27, 28, 29 | OKB·A2vOLB·A5vOMB·A8. |
| OR | 103 | AND 31 | A1·A4·A7. |
| OR | 104 | ANDs 24, 25, 26 | OKB·A1vOLB·A4vOMB·A7. |
| OR | 105 | AND 30 | A0·A3·A6. |
| OR | 106 | ANDs 21, 22, 23 | OKB·A0vOLB·A3vOMB·A6. |

The outputs of the program gate combining logic circuits form inputs to implication boxes 13–16 of FIGURE 1. Other program gate signals A9, OF1, OF2, A10, A11 and A12 are used directly by the implication boxes.

*Implication boxes*

Implication boxes 13–16 of FIGURE 1 accept program gate inputs, status inputs and prime inputs to provide intermediate outputs indicating the nearness of F to the limit ($F=>\lambda 13$) and which prime input will carry F to the limit ($KB, LB, MB=>F14$–$16$).

The implication boxes are each made up of an output OR circuit fed by several input AND circuits. The AND circuits in turn are responsive to the outputs of the program gate combining logic, the outputs of certain of status triggers 12 and prime inputs KB, LB and MB.

$F=>\lambda$ $F=>\lambda$ implication box 13 develops its output whenever the F count becomes one counting increment less than the limit. This allows the F unit to develop a dynamic $F=\lambda$ output by simply combining the $F=>\lambda$ signal with the output of one other implication box and the prime input related to the other implication box. For example, $F=\lambda$ box 1 responds to the logical AND of $F=>\lambda$, $KB=>F$ (output of implication box 14) and prime input KB by providing via latches 9 a dynamic output signal $F=\lambda$.

The $F=>\lambda$ implication box includes AND circuits and OR circuits as specified in the following charts.

F=>λ

| Circuit Type | Reference Number | Inputs | Outputs |
|---|---|---|---|
| AND | 33 | OF1, A11, $\overline{A12}$ | OF1·A11·$\overline{A12}$. |
| AND | 34 | OF2, A11, A12 | OF2·A11·A12. |
| AND | 35 | OF1, OF2 | OF1·OF2. |
| AND | 36 | $\overline{A11}$, A12 | $\overline{A11}$·A12. |
| OR | 13 | ANDs 33, 34 35, 36 | OF1·A11·$\overline{A12}$vOF2·A11·A12vOF1·OF2v$\overline{A11}$·A12. |

Implication boxes 14–16 develop their outputs to define the step F situation. The sequence of prime inputs is generally random; the implications vary as a result of the program; these implication boxes specify that the next prime input will have F significance only if it is the signal specified.

In the usual operation, only one out of the three implication boxes is effective at one time, although two may be effective for specific functions. If all three are effective, the implication loses its potency by implying F on each cycle.

IMPLICATION BOXES

KB=>F14

| Circuit Type | Reference Number | Inputs | Outputs |
|---|---|---|---|
| AND | 33 | OF1, A11, $\overline{A12}$ | OF1·A11·$\overline{A12}$. |
| AND | 37 | OR105, $\overline{A9}$ | A0·A3·A6·$\overline{A9}$. |
| AND | 38 | OR105, A9, $\overline{OF1}$ | A0·A3·A6·A9·$\overline{OF1}$. |
| AND | 39 | $\overline{OR106}$, A9, $\overline{OF1}$ | (OKB·A0vOLB·A3vOMB·A6)·A9·$\overline{OF1}$. |
| AND | 40 | $\overline{OR106}$, $\overline{A9}$ | OKB·A0vOLB·A3vOMB·H6)·$\overline{A9}$. |
| AND | 41 | OR106, A9, OF1 | (OKB·A0vOLB·A3vOMB·A6)·A9·OF1. |
| AND | 42 | OF1, A10 | OF1·A10. |
| OR | 14 | ANDs 33, 37–42 | (The OR of each of the above). |

LB=>F15

| Circuit | Reference Number | Inputs | Outputs |
|---|---|---|---|
| AND | 36 | $\overline{A11}$, A12 | $\overline{A11}$·A12. |
| AND | 42 | OF1, A10 | OF1·A10. |
| AND | 43 | OR103, $\overline{A9}$ | A1·A4·A7·$\overline{A9}$. |
| AND | 44 | OR103, A9, $\overline{OF1}$ | A1·A4·A7·A9·$\overline{OF1}$. |
| AND | 45 | $\overline{OR104}$, A9, $\overline{OF1}$ | $\overline{(OKB·A1vOLB·A4vOMB·A7)}$·A9·$\overline{OF1}$. |
| AND | 46 | $\overline{OR104}$, $\overline{A9}$ | $\overline{(OKB·A1vOLB·A4vOMB·A7)}$·A9. |
| AND | 47 | OR104, A9, OF1 | (OKB·A1vOLB·A4vOMB·A7)·A9·OF1. |
| OR | 15 | ANDs 36, 42–47 | (The OR of each of the above). |

MB=>F16

| Circuit Type | Reference Number | Inputs | Outputs |
|---|---|---|---|
| AND | 42 | OF1, A10 | OF1·A10. |
| AND | 48 | OR101, $\overline{A9}$ | A2·A5·A8·$\overline{A9}$. |
| AND | 49 | OR101, A9, $\overline{OF1}$ | A2·A5·A8·A9·$\overline{OF1}$. |
| AND | 50 | $\overline{OR102}$, A9, $\overline{OF1}$ | $\overline{(OKB·A2vOLB·A5vOMB·A8)}$·A9·$\overline{OF1}$. |
| AND | 51 | $\overline{OR102}$, $\overline{A9}$ | (OKB·A2vOLB·A5vOMB·A8)·$\overline{A9}$ |
| AND | 52 | OR102, A9, OF1 | (OKB·A2vOLB·A5vOMB·A8)·A9·OF1. |
| OR | 16 | ANDs 42, 48–52 | (The OR of each of the above). |

*Dynamic outputs*

The outputs of $F=>\lambda$ box 13 and of implication boxes 14–16 are fed back as inputs to inference boxes 1–8. These signals are combined in straightforward fashion with prime input signals KB, LB, MB to produce dynamic outputs from the inference boxes and latches 9.

| Signal Type | Dynamic Output | Significance |
|---|---|---|
| F Limit | $F=\lambda$ | F count is reaching the limit. |
| | $F\neq\lambda$ | F count is not yet reaching the limit. |
| Byte | KB, LB, MB | Prime inputs pass directly through the F unit to be used in other parts of the computer. |
| Group | KG, LG, MG | These are group signals which indicate the cumulative effect of the series of prime inputs since the last reset. |

Step F box 3 responds to implication boxes 14–16 and the prime inputs KB, LB and MB to produce the signal STEP F where the prime input matches the implication (for example, where MB prime input matches $MB=>F16$ output).

F LIMIT CIRCUITS

| Box | Circuit Type | Reference Character | Inputs | Outputs |
|---|---|---|---|---|
| $F=\lambda$ | AND | 1 | OR13($F=>\lambda$), OR3 (Step F) | $F=\lambda$. |
| $F\neq L$ | AND | 53 | $\overline{\text{OR13}(F=>\lambda)}$, $\overline{\text{SUPPRESS}}$ | $\overline{F=>\lambda}$. |
| | AND | 54 | $\overline{\text{SUPPRESS}}$, OR3 (Step F) | $\overline{\text{Step F}}$. |
| | OR | 3 | ANDs 53, 54 | $F\neq\lambda$. |
| Step F | AND | 55 | OR14(KB=>F), KB | KB=>F·KB. |
| | AND | 56 | OR15(LB=>F), LB | LB=>F·LB. |
| | AND | 57 | OR16(MB=>F), MB | MB=>F·MB. |
| | OR | 3 | ANDs 55, 56, 57 | Step F. |

*F counter*

The F counter involves triggers 121 (F2) and F1 (121) which appear at lower right, F2 generator 4 and F1 generator 5. The status triggers hold the old F count and feed this back to the generators (see feedback connections from status trigger 12 in FIGURE 1 to F2 generator 4 and F1 generator 5). The F count also affects step F box 3 via implication boxes 14–16.

Status trigger output signals OF2 and OF1 enter on conductors above the legend PRIME INPUTS at middle page left. Their use as inputs to AND circuits 33–36 has previously been explained.

F COUNTER

| Box | Circuit Type | Reference Character | Inputs | Output |
|---|---|---|---|---|
| F2Gen. | AND | 58 | OF1, F=>, Step F | OF1·$F=>\lambda$·$\overline{\text{Step F}}$. |
| | | 59 | OF2, $\overline{\text{Step F}}$ | OF2·$\overline{\text{Step F}}$. |
| | | 60 | OF2, $\overline{F=>\lambda}$ | OF2·$\overline{F=>\lambda}$. |
| | OR | 4 | ANDs 58–60 | F2. |
| | AND | 61 | A9, OF1, Step F·SUPPRESSvFORCE. | A9·OF1·Step F·SUPPRESSvFORCE. |
| | | 62 | $\overline{\text{OF1}}$, OR106($\overline{\text{A11}}$·A12), $\overline{F=>\lambda}$ Step F. | $\overline{\text{OF1}}$·OR106·$\overline{F=\lambda}$·Step F. |
| F1Gen. | | 63 | $\overline{\text{OF1, OR106, Step F}}$ | $\overline{\text{OF1·OR106·Step F}}$. |
| | | 64 | OR106, $F=>\lambda$, Step F | OR106·$F=>\lambda$·Step F. |
| | OR | 5 | ANDs 61–64 | F1. |
| F2 | Trigger | 121 | OR107 | OF2. |
| F1 | Trigger | 122 | OR109 | OF1. |

INFERENCE BOXES

*F limit circuits*

$F=\lambda$ circuit 1 appears just above the legend DYNAMIC OUTPUTS at right in FIGURE 2. Signal $F=\lambda$ is available as a dynamic output from a latch at the arrowhead. This output is the major product of the inference unit.

$F\neq\lambda$ circuit 2 is effectively the complement of $F=\lambda$ circuit 1.

*Group inference boxes*

Group inference boxes 6, 7, 8 respond to prime inputs and to their own previous condition as reflected by status triggers 124 and 125. In the input group at left of FIGURE 2, below the text PRIME INPUTS, signals OKG and OMG enter from triggers 124 and 125 at lower right. The effect of the group inference boxes is to perceive a particular characteristic of the byte sequences of a group and to retain a signal indicative of the characteristic. For example, in comparing a group (two multidigit number streams P and Q) in which high order bytes represent high order numbers, the first inequality detection such as KB ($P>Q$) controls for the entire group. These status triggers 12 feed back into the inference boxes where they are defined as old KG, old MG and old LG (OKG, OLG, OMG). OLG is defined as

GROUP INFERENCE CIRCUITS

| Box | Circuit Type | Reference Character | Input | Output |
|---|---|---|---|---|
| KG | AND | 66 | KB, Op 16–31, $\overline{\text{OMB}}$ | KB·$\overline{\text{OMG}}$ Add Mode. |
| | AND | 67 | KB, Op 0–15, $\overline{\text{OKG}}$ | KB·$\overline{\text{OKG}}$·Connect Mode. |
| | AND | 68 | NOT SUPPRESSvFORCE, Op 16–31, OKG, $\overline{\text{RESET}}$. | OKG·Add Mode. |
| | | 69 | $\overline{\text{KB}}$, NOT SUPPRESSvFORCE, Op 0–15, $\overline{\text{RESET}}$. | $\overline{\text{KB}}$·Connect Mode. |
| | OR | 7 | ANDs 66–69 | KG. |
| MG | AND | 70 | NOT SUPPRESSvFORCE, Op 16–31, OMG, $\overline{\text{RESET}}$. | OMG·Add Mode. |
| | AND | 71 | KB, Op 0–15, OKG, $\overline{\text{RESET}}$ | KB·OKG·Connect Mode. |
| | AND | 72 | MB, NOT SUPPRESSvFORCE, $\overline{\text{OKG}}$. | MB·$\overline{\text{OKG}}$. |
| | AND | 73 | LB, OMG, $\overline{\text{RESET}}$ | LB·OMG. |
| | OR | 6 | ANDs 70–73 | MG. |
| LG | AND | 74 | LB, $\overline{\text{OKG}}$, $\overline{\text{OMG}}$ | LB·$\overline{\text{OKG}}$·$\overline{\text{OMG}}$. |
| | OR | 8 | AND 74 | LG. |

KB, LB,and MB are defined in four different ways depending on the logic unit Op code. These are:

| Op Codes | KB=1 if: | LB=1 if: | MB=1 if: |
|---|---|---|---|
| 0 through 15 | Connection of odd parity. | Connection of all zeros. | Connection of even parity but not all zeros. |
| 16 through 29 | P>Q | P=Q | P<Q. |
| 30 | P+Q≥256 | Always zero | P+Q<256. |
| 31 | K, L, and M are suppressed. They are neither one nor zero. | | |

Always $LB=\overline{KB}\cdot\overline{MB}$. Parity (codes 0–15) and comparison (codes 16–29) are defined over a group by KG, LG, and MG. As the logic unit output is moved, signals KG and MG are set into non-addressable status triggers KG and MG respectively. When KG, LG, and MG are formed for the next logic unit output these triggers provide the previous values for the limit OKG, OLG, OMG logic, as follows:

| Op Code: | Equations |
|---|---|
| **0** through **15** | $KG=OKG\underline{\vee}KB.$ |
| | $MG=\overline{OKG}\cdot MG\vee OMG\cdot LB\vee OKG\cdot KB.$ |
| | $LG=LB\cdot\overline{OKG}\cdot\overline{OMG}.$ |
| **0** through **31** | $KG=OKG\vee KB\cdot\overline{OMG}.$ |
| | $MG=OMG\vee MB\cdot\overline{OKG}.$ |
| | $LG=LB\cdot\overline{OKG}\cdot\overline{OMG}.$ |

Notes:

(a) For the first byte pair of a group $$OKG=OMG=0.$$

(b) For codes 16–30 the signals KG, LG, and MG represent group comparisons only if the most significant bytes are processed first.

(c) For code 30 the signals KG, LG and MG are determined by the first pair of the group.

(1) KG and MG are set in status triggers 12 each cycle as the logic unit output is moved. The outputs of $$OLG=\overline{OKG}\cdot\overline{OMG}$$

because it has no physical status trigger.

(2) LG will be a 1 for add mode operation codes as long as corresponding bytes of the two input streams are equal. For an inequality of input streams (that is, $P>Q$ or $P<Q$). KG or MG will turn on and remain on independent of the data until reset at EOG.

(3) LB is suppressed for operation 30 binary addition with comparison; KG or MG will be determined by the first byte inequality of the group moving through the logic unit.

*Status triggers*

Status triggers 12 of FIGURE 1 are redesignated 121–127 at lower right in FIGURE 2. Each status trigger is settable by initialization means or by the dynamic output of the related inference box upon conditioning of gate conductor 10 by a signal ADVANCE CONDITIONS which essentially is a signal that the factors upon which prime inputs KB, LB, MB are based have fulfilled minimum quality provisions (i.e., have proper parity). AND circuits 83–93 and OR circuits including 107–120 are involved.

F1 status trigger 122, for example, is settable by dynamic output F1 from F1 box 5 via the related one of latches 9, gated AND circuit 92 and OR circuit 109.

Each status trigger except MG and KG triggers 124–125 can also be initialized to a value received from the computer via bus 18 by a signal GATE BUS 18 coincident to a signal BIT N. Exemplary AND circuits 87 and 88 are shown connected to several status triggers; actually a different signal is available for each status trigger to replace signal BIT N, in such fashion that triggers 121, 122, 123, 126, 127 can be set to arbitrary values. If BIT N is conditioned, AND circuit 88 sets the related status trigger to 1 when GATE BUS 18 is conditioned; if BIT N is deconditioned, AND circuit 87 sets the related status trigger to 0. The status trigger thus is initialized to the value of binit N. The asterisks indicate that initializing circuits are not shown in complete detail.

STATUS TRIGGERS

| Trigger | Circuit Type | Reference Character | Input | Output |
|---|---|---|---|---|
| F2 | AND | 93 | F2 GEN 4 | (Dynamic) F2 on. |
| | AND* | 88 | GATE BUS 18, BIT N (F2). | (Initialize) F2 on. |
| | OR | 107 | F2 GEN ADVANCE CONDITIONS. | F2 on. |
| | Trigger | 121 | F2 on | OF2. |
| | AND* | 87 | GATE BUS 18, $\overline{\text{BIT N}}$ (F2). | (Initalize) F2 off. |
| | AND | 89 | | (Dynamic) F2 off. |
| | OR | 108 | F2 off | |
| | Trigger | 121 | F2 off | $\overline{\text{OF2}}$. |
| F1 | AND | 92 | F1 GEN 5, ADVANCE CONDITIONS. | (Dynamic) F1 on. |
| | OR | 109 | F1 on | F1 on. |
| * | Trigger | 122 | F1 on | OF1. |
| | OR | 110 | F1 off | F1 off. |
| | Trigger | 122 | F1 off | $\overline{\text{OF1}}$. |
| F=λ | AND | 91 | F=λ1 (OR94) | F=λ. |
| * | OR | 111 | F=λ | F=λ on. |
| | Trigger | 123 | F=λ on | F=λ (Status). |
| | AND | 90 | F=λ1 (OR94) | $\overline{\text{F=λ}}$. |
| | OR | 112 | F=λ | F=λ off. |
| | Trigger | 123 | F=λ off | F=λ (Status). |

| Trigger | Circuit Type | Reference Character | Input | Output |
|---|---|---|---|---|
| | AND | 85 | $\overline{\text{OR 6}}$ | $\overline{\text{MG}}$. |
| MG | OR | 113 | $\overline{\text{MG}}$ | $\overline{\text{MG}}$. |
| * | Trigger | 124 | $\overline{\text{MG}}$ | $\overline{\text{OMG}}$. |
| | AND | 86 | OR 6 | MG. |
| | OR | 114 | MG | MG. |
| | Trigger | 124 | MG | OMG. |
| | AND | 83 | $\overline{\text{OR 7}}$ | $\overline{\text{KG}}$. |
| | OR | 115 | $\overline{\text{KG}}$ | $\overline{\text{KG}}$. |
| | Trigger | 125 | $\overline{\text{KG}}$ | $\overline{\text{OKG}}$. |
| KG | AND | 84 | OR 7 | KG. |
| * | OR | 116 | KG | KG. |
| | Trigger | 125 | KG | OKG. |

STATUS TRIGGERS

| Trigger | Circuit Type | Reference Character | Input | Output |
|---|---|---|---|---|
| | AND | 77 | $\overline{\text{MB}}$, Advance Conditions. | MB off. |
| | OR | 117 | MB off | MB off. |
| MB | Trigger | 126 | MB off | $\overline{\text{OMB}}$. |
| * | AND | 78 | MB, Advance Conditions. | MB on. |
| | OR | 118 | MB on | MB on. |
| | Trigger | 126 | MB on | OMB. |
| | AND | 75 | $\overline{\text{KB}}$, Advance Conditions. | KB off. |
| KB | OR | 119 | KB off | KB off. |
| | Trigger | 127 | KB off | $\overline{\text{OKB}}$. |
| * | AND | 76 | KB, Advance Conditions. | KB on. |
| | OR | 120 | KB on | KB on. |
| | Trigger | 127 | KB on | OKB. |

*Reset*

AND circuits 79–82 and Reset F trigger 98 provide signal RESET F TGR when appropriate, at end of group (AND circuit 79), at initialization (AND circuit 80 when called for by the related BIT N) and upon call of signal ADJustment RESET F and INSTRUCTION RESET. AND circuit 82 holds trigger 98 off during normal advance conditions; AND circuit 81 can set trigger 98 off during initialization.

The signal RESET F TGR sets status trigger 121 (F2) to 0 via AND 89 and OR 108; since RESET F TGR false inputs are included on program inputs at top left it prevents any inferences during the reset interval by dropping the false input.

*Components*

Logic design using AND and OR circuits is explained in Richards, "Arithmetic Operations in Digital Computers," Van Nostrand, 1955. The AND circuit responds to conditioning of *all* its inputs by conditioning its output. If inputs are A, B, C, output requires conditioning of each of A, B, C and bears logical significance A·B·C (A and B and C). The OR circuit responds to conditioning of any one or more of its inputs by conditioning its output. If A, B, C are inputs, output is AvBvC (A or B or C). Simple AND and OR circuits are made by grouping diodes with a common load resistor; complements are obtainable by the use of inverters.

Current mode transistor logic circuits which give both true and complement outputs (true and false connections) according to their logic, are disclosed in U.S. Patent Number 2,964,652, issued December 13, 1960, Yourke, Transistor Switching Circuits, assignee IBM. For high speed operation high quality current mode circuits are preferred; where speed is not a major objective, cheaper logic devices may be used.

EXAMPLES

STOnE~STORE ≁ STOP

The program unit for a computer incorporating the F unit operates on symbolic instructions. The programer prefers to deal with pronounceable words such as STORE rather than with the binary numbers which the computer actually requires as programing for the store instruction.

The symbolic instructions as presented (FETCH, ADD, STORE, TEST, etc.) are converted into machine language by table lookup, so that the actual instructions might be (12, 21, 37, 16, etc.) in numeric. The table lookup proceeds so long as there is an actual instruction to match the symbolic instruction. If the symbolic instruction is an error, it does not match any of the actual instructions, and this fact will be recognized. The computer can then jump to an "infer instruction" sequence.

During the "infer instruction" sequence, the faulty instruction is presented repeatedly to the logic unit as a P stream of bytes. The actual instructions are presented in sequence as a Q stream of bytes. The streams are compared character by character in 5-character groups, to determine if there is any "almost equal" actual instruction. The logic unit does any add mode operation; LB signifies that $P=Q$.

The faulty instruction is STOnE. The list of actual instructions includes STOP* and STORE. The F limit is 2.

| | | |
|---|---|---|
| P Stream | STOnE | STOnE |
| Q Stream | STOP* | STORE |
| F Count | 00012 | 00011 |
| F=λ | x | |
| F≠λ (EOG) | | x |

Since LB means $P=Q$, $\overline{LB}$ is used to step F. Thus the F count reflects the number of characters of the actual instruction which do not match the symbolic instruction STOnE.

STOP* matches for the first three characters STO. The P does not match the n; F count goes to 1. The asterisk, used to ensure that each symbolic instruction contains five characters, does not match the E. The F count goes to 2, which equals the limit. STOP* is not sufficiently similar to STOnE to be accepted at End of Group.

STORE matches the STOnE for three characters STO. The R does not match the n; the F count goes to 1. The E's match; the F count remains at 1 at EOG. F count (EOG) L2 infers an acceptable similarity; STORE is selected as the word desired which was erroneously requested by the word STOnE.

*Typewriter keyboard analysis*

Touch typists use all ten fingers to select character sequences. If the left little finger is numbered 1, the left thumb 5, the right thumb 6 and the right index finger 7, etc., analysis can be made of finger assignments, finger speed and word frequency to optimize key character assignments.

Finger speed, however, is a function of character sequence. Where it is necessary to strike consecutive keys with the same finger, speed lags drastically. A keyboard will provide greater finger speed and greater efficiency if it is arranged so that common words can be typed without the need for any finger to strike consecutive keys.

For example, a touch typist can type JACK much faster than JUNE since JACK is typed by four different fingers while JUNE uses the right index finger for three consecutive strokes. The third stroke with finger 7 is about as fast as the second; thus any prolonged sequence of 7's is effectively merely a series of doublet 7's.

A list of common words is recorded into digital finger assignments, and presented to the logic unit. The P stream is one digit ahead of the Q stream so simple sequence comparison is performed by any add mode operation. LB indicates equality of P and Q; OLB·LB specifies a doublet and thus implies F. F limit is 1. A count of the number of times F reaches the limit is thus a count of doublets.

| | |
|---|---|
| P Stream | J A C K—J U N E—J U R Y—K A B O B—<br>7 1 3 8 6 7 7 7 3 6 7 7 4 7 6 8 1 4 9 4 6 |
| Q Stream | - 7 1 3 8 6 7 7 7 3 6 7 7 4 7 6 8 1 4 9 4 |
| F=λ | 1 1 1 |

There are three doublets in this series of relatively uncommon words. Another keyboard layout might have five doublets; another only 1. The keyboard which produces the fewest doublets is the most efficient for any group. The doublet count can be weighted by the computer so that a doublet in a common word such as "they" counts 50 points while a doublet in a less frequently used word such as "cavil" counts only 1 point, so that the weighted doublet count is a very close approximation of an empirical test.

While the invention has been particularly shown and described with reference to a preferred embodiment, it will be understood by those skilled in the art that various changes in form and details may be made without departing from the spirit and scope of the invention.

What is claimed is:

1. An inference unit for a data processing system, said system being responsive to two streams of operand bytes, P and Q, and generating for each pair of bytes, one of a plurality of signals, each signal indicating the occurrence of a corresponding relationship between the operand bytes then being processed, said inference unit comprising;

(a) a plurality of program devices settable in combinations to determine the responses of said inference unit to said signals, (b) a plurality of status trigger including a counter and other triggers variously set by said input signals to correspond to the latest signal and to the condition of prior signals, (c) a plurality of implication units controlled by said latest signal status triggers and said settable program devices to indicate which signal of said plurality of signals is to be counted if it is the next generated signal, and (d) inference means receiving said signals and conditioned by said implication units to pass the indicated one of said next generated signals to operate said counter of said status triggers.

2. An inference unit as claimed in claim 1 including;

(a) means in said plurality of settable program devices to define a limit for said counter, (b) a unit controlled by said counter limit means and said counter to provide a signal when the value stored in said counter is one unit below the defined limit, (c) a second inference means responsive to said implication units, to the signal from said counter limit controlled unit, and to said generated signal to provide an indication that the count limit has been attained and (d) means responsive to said indication that the count limit has been attained to set a corresponding status trigger.

3. An inference unit for a data processing system, said system being responsive to two streams of operand bytes, P and Q, and generating for each pair of bytes, one of three signals, each signal indicating the occurrence of a corresponding relationship between the operand bytes then being processed, said inference unit comprising;

(a) a plurality of program triggers independently settable for selecting at least one sequence of the nine possible two signal sequences of said signals and including at least two triggers combinationally settable to indicate a count limit, (b) a plurality of status triggers including at least two triggers combinationally settable to act as a binary counter, a group of triggers to represent the last generated signal and another group representative of a portion of the past history of said generated signals, (c) a plurality of implication units responsive to said program triggers and said status triggers to indicate when the next counted sequence will set the counter at the indicated limit and to indicate those of the three signals which will complete a selected sequence and;

(d) a group of inference gates connected to said status triggers and to said implication units and receiving said generated signals to generate signals indicating that the count in said counter is to be increased by a unit, that the count in said counter when increased as required will be at the limit or that the count will not be at the indicated limit and the new settings of the counter forming status triggers for the increased count.

4. An inference unit as claimed in claim 3 including;

(a) a further group of inference gates responsive to said past history group of status triggers and to said generated signals to provide an output indicative of the succeeding setting of said past history group of status triggers, (b) a plurality of latches to receive and retain said input signals and the outputs of said inference gates and (c) cyclically timed gates to transmit the settings of said latches to said status triggers to set the status triggers to accord with the settings of said latches.

References Cited by the Examiner

UNITED STATES PATENTS 3,021,069 2/1962 Rowly ............. 235—168

ROBERT C. BAILEY, *Primary Examiner.*

MALCOLM A. MORRISON, *Examiner.*